May 13, 1958  M. A. MOSER  2,834,082

PIN FASTENERS FOR FURNITURE COVERS AND THE LIKE

Filed Nov. 29, 1954

*INVENTOR.*
MARIETTA A. MOSER
BY

United States Patent Office 2,834,082
Patented May 13, 1958

2,834,082

PIN FASTENERS FOR FURNITURE COVERS AND THE LIKE

Marietta A. Moser, Erie, Pa.

Application November 29, 1954, Serial No. 471,832

8 Claims. (Cl. 24—152)

This invention relates to fastening devices and more particularly to fasteners for holding two fabric materials together.

This application is a continuation in part of application Serial No. 281,330, filed April 9, 1952, which issued as Patent No. 2,697,863 on December 28, 1954.

In the said application, a fastening device for fastening fabric material, for example, slip covers on chairs, mattress covers, sheets on beds, and other purposes, is disclosed wherein a plurality of spaced pin members are disposed on a rigid body member with fastening means at the end thereof. This application discloses an improvement on the said pin wherein an improved fastening means is provide which will hold the pin in place while in use.

It is, accordingly, an object of this invention to provide a fastener with an improved locking device thereon which is simple in construction, economical to manufacture, and simple and efficient to use.

Another object of this invention is to provide an improved fastening means for a furniture fastener.

Another object of the invention is to provide a body member having a pin member rigidly attached thereto and having a locking member swinging in a direction toward the pin member.

A further object of this invention is to provide a fastening member having spaced pin members thereon and having a locking member swingable toward the pin members.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
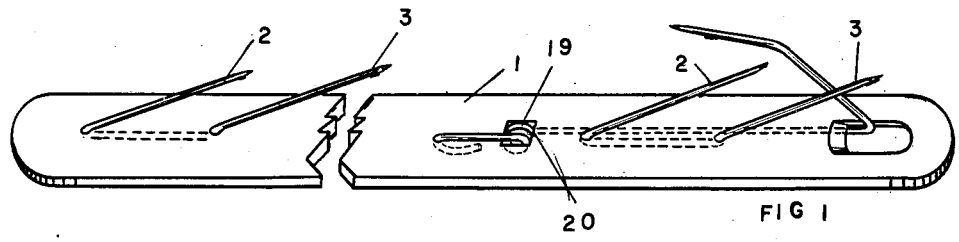
Fig. 1 is a perspective view of the pin according to the invention.
Figure 2:
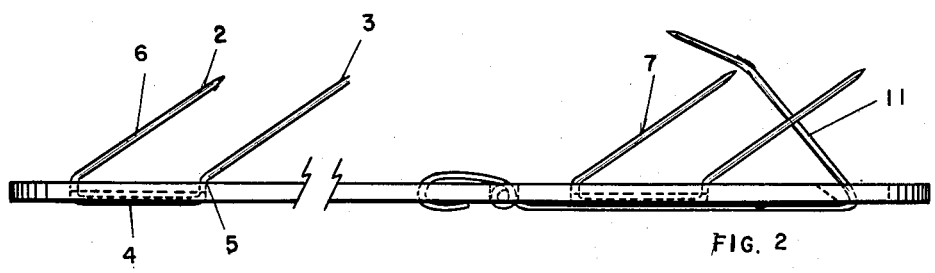
Fig. 2 is a side view of the pin shown in Fig. 1.

Now with more specific reference to the drawing, the pin member has an elongated flat relatively rigid body member 1 having spaced prong members 2 and 3 attached thereto. The prong member 2 is connected to the prong member 3 through an intermediate portion 4. That is, prong members 2 and 3 and intermediate member 4 comprise a U-shaped piece of wire inserted through holes 5 in the body member 1 and having both prongs 2 and 3 bent in the same direction. The prong members 2 and 3 and the intermediate member 4 comprise a pin member 6 which is manufactured or made from an integral piece of wire. The pin members 6 are disposed at spaced points along the body member 1 and are embedded in a channel 8 connecting the holes 5 so that the lower surface of the connecting intermediate member 4 is substantially flush with the lower surface 9 of the body member 1.

A plurality of the pin members 6 would, in practice, be disposed in spaced relation on the body member 1, preferably at uniformly spaced positions. A pin member 7 would preferably be disposed adjacent the end having the locking prong 11 thereon.

Figure 3:
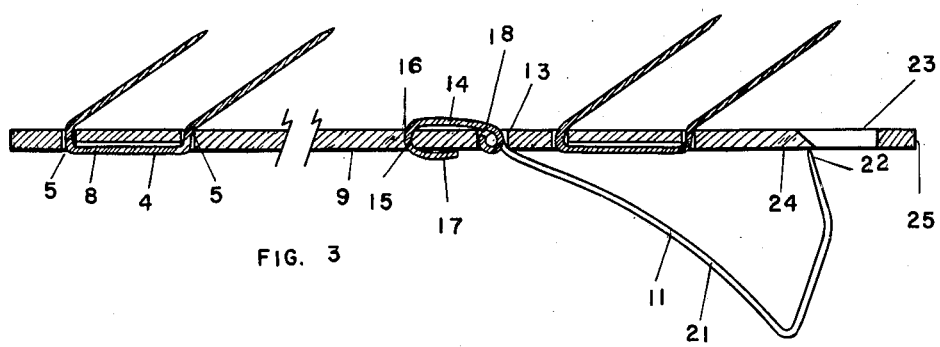
Fig. 3 is a longitudinal cross sectional view of the pin shown in Fig. 2.

The locking prong 11 is inserted through the opening 13 in the body member 1 and extends over one side thereof at 14 and the end 15 extends through an opening 16 and is bent back on itself at 17 to form a hook. Because of the arrangement of the bent back portion 17 forming a hook, the locking prong 11 is rigidly secured to the body 1. A portion 18 of the locking prong 11 is preferably given one or more turns 19 and 20 to add additional resiliency so that the intermediate portion 21 can swing about the portion inserted in the opening 13 without developing undue stress in the material thereof and allows the point 22 to be pulled completely from the opening 23 to the cocked position shown in Fig. 3 with the points 22 resting on the lower edge 24 of the body 1. Because of the resiliency of the portions 21 of the locking prong 11, the point 22 will be urged into engagement with the back of the body 1 and, therefore, hold it in the cocked position shown in Fig. 3 while prongs 2 and 3 are being inserted in fabric to be fastened.

With the locking prong in cocked position, the pins 6 and 7 can be inserted into the fabric material or a plurality of juxtaposed fabric materials to hold them together. When they are thus inserted, the point 22 can be manually urged along the back edge 24 toward the end 25 of the body 1 until the point 22 comes into registration with the opening 23. At this point, the resiliency of the locking prong 11 will urge the point 22 through the opening 23 and the point 22 will be urged toward the pins 6 and 7. The point 22 will continue to be urged through the fabric material to be fastened and the locking prong 11 will lock the pin in the fabric.

The foregoing specification sets forth the invention in its preferred practical forms but the structure shown is capable of modification within a range of equivalents without departing from the invention which is to be understood is broadly novel as is commensurate with the appended claims.

The embodiments of the invention are claimed as follows:

1. A fastener comprising an elongated body member made of relatively rigid material having an opening formed therein and extending from the front side to the back side thereof, a first prong member attached to said body member at a location spaced from said opening, and a locking prong attached to said body member on the back side at a position spaced from said opening and having a pointed end, said pointed end being positioned to extend through said opening, the pointed end of said locking prong adapted to swing through said opening toward said first prong member.

2. A fastening device comprising a rigid body member having a front and a back, a prong member attached to said body member, and a locking prong comprising a piece of wire having a turned portion adjacent one end, said turned portion being disposed in a first opening in said body member on one side of said body member, said wire extending through said first opening and along the front of said body member and through a second opening in said body member and fastened therein, the opposite end of said locking prong adapted to extend through a third opening in said body member on the opposite side of said body member, said locking prong adapted to swing through said third opening toward said body member, locking said body member in a fabric to be fastened.

3. The fastening device recited in claim 2 wherein a plurality of prong members are attached to said body member in spaced relation between said second and third openings, said prong members being pointed at one end and inclined toward said locking prong.

4. The fastening device recited in claim 2 wherein a plurality of spaced prong members are disposed on said body on each side of said first opening.

5. A fastening device comprising a relatively rigid body member, first spaced holes in said body member, longitudinally spaced, generally U-shaped, pointed pronged pin members extending through said first holes with their prongs inclined in the same direction, a locking member comprising a resilient pointed locking prong attached to said body member at the end opposite the point with the point of said locking prong inclined toward said pronged members, and an opening in addition to said holes in said body member, said locking prong being attached to said body member on the back of said body member, said pronged pin members extending outwardly from the front of said body member, said locking prong being extendable through said opening in said body member and swingable therethrough, a portion of said locking prong being adapted to be moved through said opening to a cocked position with the point thereof engaging said body member on the back thereof holding said portion in cocked position, said resiliency of said locking prong urging said locking prong toward a closed position wherein said portion extends through said opening to dispose the point adjacent said pronged pin members on the front of said body member.

6. In a fastening device for holding slip covers on chairs, a body member having a flat surface on one side, the side opposite said one side defining the back of said body member, a pin member disposed on said body member and having a first prong and a second prong, said prongs being longitudinally spaced and inclined in the same direction at an angle of less than ninety degrees to the logitudinal axis of said body member and extending from said flat surface, said pin member comprising a piece of wire bent at two spaced points to form said two prongs, and a locking means comprising a locking prong attached to the back of said body member and disposed laterally of one of said two prongs and positionable to extend beyond said flat surface, said locking prong having a proximal end attached to said body member with a portion generally in alignment with said first and second prongs, said proximal end of said locking prong being bent back on itself at an acute angle to itself and extending through a second opening in said body member and toward said pin member.

7. The fastening device recited in claim 6 wherein a plurality of said pin members comprising bent wires are disposed in longitudinally spaced relation on said body member with said prongs inclined in the same direction.

8. The fastening device recited in claim 6 wherein said locking prong comprises a locking member made of resilient wire having a plurality of turns adjacent said proximal end thereof and being bent back on itself beyond one side of said turns and having a forward portion at an acute angle and terminating in a pointed projection at the other side of said turns, said body member having a third opening receiving said turns, said bent back end being attached to said body member, said forward portion extending along the back of said body member and said projection extending through said second opening in said body member, said pointed projection on said locking prong being inclined toward said prongs.

References Cited in the file of this patent

UNITED STATES PATENTS

| 27,519 | Brown | Mar. 20, 1860 |
| 392,367 | Saxton | Nov. 6, 1888 |
| 718,325 | Dickerson | Jan. 13, 1903 |
| 815,353 | King | Mar. 20, 1906 |
| 945,260 | Berger | Jan. 4, 1910 |
| 2,306,947 | Heyman | Nov. 29, 1942 |
| 2,334,662 | Welch | Nov. 16, 1943 |
| 2,388,427 | Madger | Nov. 6, 1945 |
| 2,697,863 | Moser | Dec. 28, 1954 |

FOREIGN PATENTS

| 18,283 | Great Britain | of 1894 |
| 584,927 | Germany | of 1933 |